(No Model.)

R. COWEN.
BELTING.

No. 473,696. Patented Apr. 26, 1892.

WITNESSES.
A. F. Macdonald.
A. D. Harrison.

INVENTOR.
Robt Cowen,
by
Wright, Brown & Crossley
Attys.

UNITED STATES PATENT OFFICE.

ROBERT COWEN, OF CAMBRIDGE, ASSIGNOR TO THE BOSTON WOVEN HOSE COMPANY, OF BOSTON, MASSACHUSETTS.

BELTING.

SPECIFICATION forming part of Letters Patent No. 473,696, dated April 26, 1892.

Application filed May 8, 1891. Serial No. 392,008. (No model.)

*To all whom it may concern:*

Be it known that I, ROBERT COWEN, of Cambridge, in the county of Middlesex and State of Massachusetts, have invented certain new and useful Improvements in Belting, of which the following is a specification.

This invention has relation to belting generally, though more particularly to that class or kind commonly known as "india-rubber belting," in which the goods are made from rubber cloth or rubber duck folded to a sufficient thickness and desired width, and the several plies are held together or blended into one by what is commonly termed "friction."

In the use of belting of the character mentioned there is liability after a time of failure of the friction and consequent tearing apart of the plies. To remedy this objection it has been proposed to stitch the plies together (in addition to cementing them together by means of friction) by lines of stitches running longitudinally of the belt. A fault, however, is also found with this construction in that the outside threads of the lines of stitches take all of the strain in passing around pulleys or drums, which threads either break or operate to weaken the belt by cutting into the duck.

It is the object of the present invention to provide such improvements in stitching belting as will obviate the objections mentioned and hold the plies securely together.

To these ends the invention consists of a belt in which the plies are stitched together by lines of stitches, the threads of which stitches upon one side run longitudinally of the belt, while on the opposite side the threads of the stitches run or lie across the belt, all as is hereinafter more fully described and claimed.

Reference is to be had to the accompanying drawings and the letters marked thereon, making a part of this specification, the same letters designating the same parts or features, as the case may be, wherever they occur.

Figure 1:
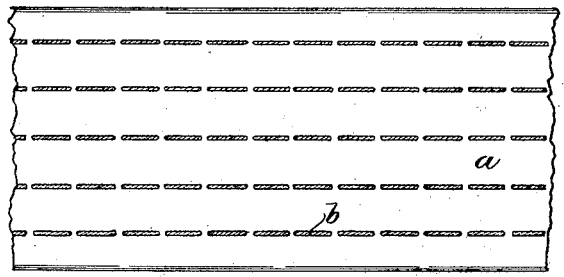
Figure 2:
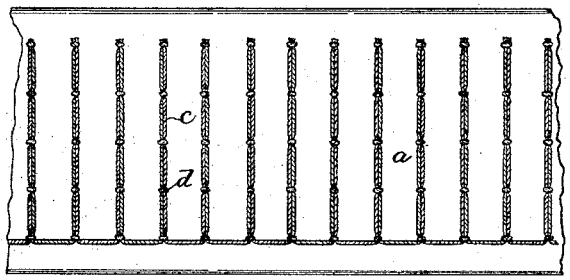
Figure 3:
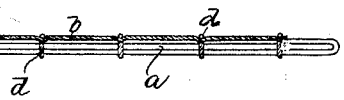
Figure 4:
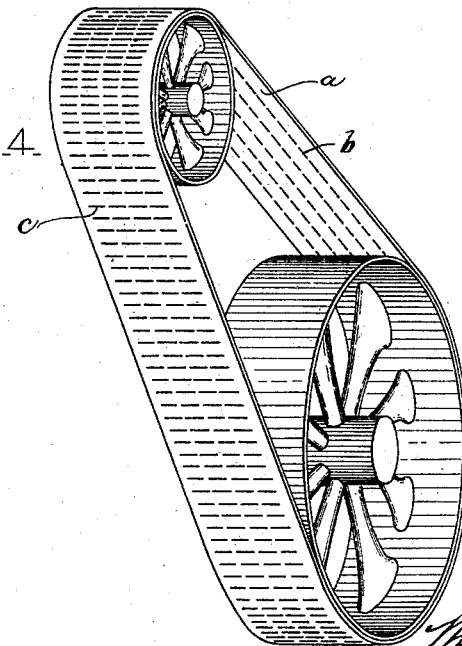

In the drawings, Figure 1 is a plan view of the inside face of the improved belting, in which the threads of the lines of stitches run longitudinally of the said belting. Fig. 2 is a plan view of the outside face of the belting, in which the threads of the lines of stitches lie across the same. Fig. 3 is a cross-sectional view on a line coincident with a line of cross-threads. Fig. 4 is a perspective view showing my improved belting in use upon a pair of pulleys.

In the drawings, $a$ designates the improved belting, shown in the present instance as made up from four folds or plies of india-rubber duck frictionally blended into one. A greater or less number of plies may, however, be employed and other cloth than duck may be used.

$b$ designates lines of stitches, the threads of which lying on the inside of the belting run longitudinally of the same, and $c$ designates the lines of stitches as they appear on the outside of the belting—that is, as lying or running across the same—the longitudinal lines of threads being interlocked, as at $d$, with the lines of cross-threads at all points where the former enter the belting. The character of the stitching is such that each line of cross-threads $c$ intersects and is interlocked with each line of longitudinal threads $b$.

With this construction and the belt arranged upon pulleys, as shown in Fig. 4—that is, so as that the cross-threads of the lines of stitches will be on the outside and the longitudinal threads on the inside—no undue strain is brought upon the threads of the stitches to break them or cause them to cut into the duck, as is the case where the threads of the lines of stitches on both the outside and inside run longitudinally of the belt, as hereinbefore explained.

It is to be observed that the manner of stitching belting described may be employed on other kinds than rubber belts.

Having thus explained the nature of the invention and described a way of making and using the same, though without attempting to set forth all of the forms in which it may be constructed or all of its modes of use, I declare that what I claim is—

1. Belting stitched or quilted with lines of stitches, the threads of which on one side of face extend longitudinally of the belt and on the opposite side run across or transversely of the same and within the marginal edges of the belt, as set forth.

2. Belting composed of a plurality of plies of material united by lines of stitches, the threads of which stitches on one side or face extend longitudinally of the belt and on the opposite side run across or transversely of the same and within the marginal edges of belt, as set forth.

In testimony whereof I have signed my name to this specification, in the presence of two subscribing witnesses, this 1st day of May, A. D. 1891.

ROBERT COWEN.

Witnesses:
ARTHUR W. CROSSLEY,
A. D. HARRISON.